Patented Sept. 7, 1948

2,448,609

UNITED STATES PATENT OFFICE 2,448,609

COMPOSITION COMPRISING ORGANIC PEROXIDE CURED GLYCOL-DICARBOXYLIC ACID POLYESTER AND RED OXIDE OF IRON

Frank S. Malm, Millburn, N. J., assignor to Bell Telephone Laboratories, Incorporated, New York, N. Y., a corporation of New York No Drawing. Application April 30, 1943, Serial No. 485,164

11 Claims. (Cl. 260—40)

This invention relates to synthetic rubber compounds containing reinforcing pigments which impart to them tensile strengths which are outstanding as compared to those imparted by other pigments.

A new class of synthetic rubbers has recently been developed which is manufactured by curing plastic or thermoplastic polyesters of high molecular weight with benzoyl peroxide or other substances having a similar action. The curing is accomplished by intimately mixing the uncured polyester with the curing agent and heating the mixture to a curing or vulcanizing temperature. The present invention deals with the compounding of these rubbers with reinforcing pigments.

It is the common practice in the compounding of natural and synthetic rubbers to add various mineral fillers and pigments prior to vulcanizing, primarily for the purpose of reducing modulus and increasing tensile strength. Two of the pigments most commonly used in natural rubber for their outstanding reinforcing action are the colloidal carbon blacks and zinc oxide.

Neither of these pigments is satisfactory for compounding with the polyester rubbers referred to above. Although carbon black provides a good initial reinforcing action, it deactivates the peroxide curing agent, making it necessary to use extremely large amounts of this curing agent in order to obtain complete vulcanization. The extremely large amount of curing agent renders the vulcanization product unstable and of short life. Zinc oxide also renders the cured product unstable regardless of the amount of curing agent employed. When substantial amounts of zinc oxides are present in a cured polyester, the polymer is degraded so rapidly at 100° C. that it may be reduced to a liquid in forty-eight hours. When both carbon black and zinc oxide are present the degradation proceeds so rapidly at the curing temperature that it is impossible to obtain vulcanization in a mold, regardless of the amount of curing agent used.

Certain of the other common mineral fillers such as the various clays, titanium dioxide, aluminum oxide, talc, antimony oxide, and the coarser calcium carbonates give substantial increases in tensile strength and modulus. However, with the exception of an ultra-fine precipitated calcium carbonate, sold under the tradename of Kalvan, no pigment has been found which produces a relatively stable cured product and which imparts to the cured polyesters a tensile strength approaching that of extremely pure red oxide of iron made up of spheroidal particles having an average particle size of the order of 60 millimicrons.

The present invention is concerned with the use of this red oxide of iron in the compounding of polyester rubbers which are cured with peroxides.

A pigment of this type is sold commercially under the name Mapico 297. It is prepared by heating commercial copperas ($FeSO_4 \cdot 7H_2O$) in a stream of dry air until it has been substantially dehydrated and then calcined the dehydrated substance in a rotating cylindrical furnace under conditions such that the temperature of the material is never raised above 1,400° F. The calcined material is washed in water to remove the soluble impurities. The washed product, when dried and ground, has the properties described above. This process of manufacture is described in more detail in United States Patent 2,184,738.

This form of iron oxide appears to be unique in its outstanding reinforcing action. Other forms of red iron oxide, such as Williams' iron oxide, and Mapico 516–M, which are non-spheroidal and somewhat larger in particle size, exert a much inferior reinforcing action.

The peroxide cured polyester rubbers to which the present invention is applicable are described and claimed in the copending application of C. S. Fuller, Serial No. 485,202, filed on the same day as the present application. The uncured polyester gums, from which the cured rubbers are derived, may be strictly linear polyesters of high molecular weight containing no non-benzoid carbon-to-carbon unsaturation, which are prepared by the superesterification of a glycol with a dicarboxylic acid, or of a hydroxy acid with itself, in a manner similar, for instance, to that described for crystalline polyesters in United States Patents 2,071,250 and 2,249,950.

Polyesters which are essentially similar but which contain limited amounts of olefinic or non-benzenoid unsaturation may also be cured to form synthetic rubbers to which the present invention is applicable. These partially unsaturated polyesters may be prepared in the same manner as the fully saturated polyesters except that one or more of the ingredients of the reaction mixture from which they are prepared contain a properly limited amount of unsaturated carbon-to-carbon bond.

The polyester gums, the preparation of which will be described in more detail below, are extremely viscous liquids which at room temperatures have a consistency somewhat similar to that of milled crepe rubber or else they are somewhat flexible rubbery solids of slight crystallinity which melt readily at temperatures up to about 20° C. above room temperature to form viscous liquids of a consistency similar to the normally liquid polyesters. These latter substances possess sufficient flexibility, being largely amorphous, to be milled directly on cold rolls, where they are almost instantly reduced to a viscous liquid state by the temperature rise induced by milling.

The more highly crystalline polyesters, when cured, form hard rigid substances. However, since these cured, highly crystalline polyesters lose their rigidity above their crystalline melting points and become rubber-like in their properties, the present invention is also of advantage in pigmenting these substances if they are to be used as rubbers at elevated temperatures.

The present invention is concerned primarily with the pigmenting of those elastomers of high tensile strength produced by curing polyesters which have achieved an extremely high degree of linear growth.

With the strictly linear polyesters prepared from glycols and dicarboxylic acids containing no non-benzenoid unsaturation or from monohydroxy monocarboxylic acids containing no non-benzenoid unsaturation, the degree of linear growth is measured directly by the molecular weigh of the polyester, since theoretically each molecule is made up of a single long chain. There is a relatively sharp increase in the tensile strength of the cured polyesters when the molecular weight of the linear polyesters from which they are prepared achieve and exceed molecular weights in the vicinity of 8,000 to 10,000, as estimated by the Staudinger viscosity method. Linear polyesters of such molecular weights ordinarily possess intrinsic viscosities in chloroform of at least .4. Linear polyesters will also possess such molecular weights if they contain an average of at least 500 or 600 atoms in their linear chains or if they contain at least 98 ester groups for each 100 total ester, hydroxyl and carboxyl groups in the polyester (98 per cent of theoretical complete esterification).

Polyesters formed from reactants, at least one of which contains olefinic unsaturation, will possess these high molecular weights associated with high tensile strength if they contain at least 98 ester groups per 100 total ester, hydroxyl and carboxyl groups in the polyester.

In order to produce the high degree of esterification or condensation indicated above, the reactants from which the polyesters are produced must be subjected to a prolonged heating operation under conditions such as to remove the reaction by-products continuously and effectively as described, for instance, in United States Patents 2,071,250 and 2,249,950. The reaction by-products are most effectively removed by bubbling an inert gas such as dry, oxygen-free hydrogen through the reaction mixture until esterification or condensation has proceeded to the desired degree of completion, with or without the application of reduced pressure.

The uncured polyesters may be derived from any glycols and dicarboxylic acids or any monohydroxy monocarboxylic acids which are capable of esterifying to form linear ester chains having lengths of the order desired. Typical saturated glycols and dicarboxylic acids are described in United States Patent 2,071,250. Unsaturation may be introduced by substituting an unsaturated dicarboxylic acid such as muconic, maleic, fumaric, itaconic, mesaconic or dihydromuconic acid for a part of the saturated acid. Similarly, a glycol containing olefinic unsaturation may be substituted for a portion or all of the saturated glycol or a hydroxy acid containing olefinic unsaturation may be substituted for all or part of a saturated hydroxy acid.

In order to produce polyesters of the high degree of linear growth referred to above which possess good reversible elasticity when cured, it is necessary to limit the amount of unsaturation present in the reaction mixture so that the resulting theoretical polyester which would be produced if no cross-linking occurred would contain less than about five olefinic bonds per 400 atoms in the linear chain and preferably less than about two such bonds per 400 atoms in the linear chain. When polyesters are formed from maleic acid in mixture with a saturated dicarboxylic acid, such as sebacic or succinic acid, it is ordinarily desirable that the saturated acid constitute at least 95 mol per cent of the dicarboxylic acid mixture so that the polyester may achieve the desired degree of linear growth.

In order to produce cured polyesters which are rubber-like and do not possess crystalline rigidity at room temperatures, it is necessary to prepare the uncured polyesters from reactants which will yield polyesters of a sufficient degree of non-crystallinity to be non-brittle and non-rigid at room temperatures. In producing such non-crystalline polyesters or polyesters of limited crystallinity, advantage is taken of the fact that certain ingredients lead to polyesters which are incapable of crystallization or which have crystalline melting points below room temperatures or which crystallize so slowly that for practical purposes they may be considered permanently non-crystalline.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or hetero-atoms in the linear chains, are usually non-crystalline. However, if the other member of the reaction mixture is a polymethylene glycol or a polymethylene dicarboxylic acid, the crystallizing tendencies of the polyester increase as the length of the polymethylene chain increases. Thus, dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol or methylethylene glycol. This glycol forms non-crystalline polyesters with polymethylene dicarboxylic acids between succinic acid and sebacic acid. Polyisopropylene succinate does not become excessively crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing excessive crystallization.

Although dicarboxylic acids containing conjugated unsaturation, such as maleic or fumaric acid, form non-crystalline polyesters with the common polymethylene glycols, they are used in such small concentrations in the polyesters of the present invention that their effect upon the crystallinity is not great.

The most available of the non-crystalline polyester forming reactants containing hetero-atoms are diethylene glycol and di-isopropylene glycol. Diglycolic acid is also of some interest as a hetero-atom containing compound. The most available of the aromatic ring containing reactants is phthalic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly and are therefore useful for forming certain of the cured synthetic rubbers of the present invention which are not rigid at room temperatures.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids, or similar polyesters in which maleic acid is substituted for portions of the succinic acid, the disorder imparts sufficient non-crystallinity to render the cured polyester rubber-like at room temperatures.

The non-crystalline or slightly crystalline polyesters are compounded by milling on cold rolls with a curing agent such as benzoyl peroxide, preferably in the form of a finely divided powder or precipitated upon finely divided calcium carbonate. The red oxide of iron reinforcing pigment described above is then thoroughly milled with the polyester, together with any other compounding ingredients which are to be added. The compounded polyester is then heated in a mold to a temperature sufficient to effect curing.

When the polyesters are more highly crystalline, milling may be carried on with hot rolls maintained above the crystalline melting point but below the curing temperature. The ingredients may also be mixed in solution.

The amount of curing agent required to give maximum tensile strength varies with the composition of the polyester, being affected both by the nature of the saturated components and by the amount of unsaturation. When a given polyester is cured with increasing amounts of benzoyl peroxide, the tensile strength rises very sharply, passes through a peak, and then decreases slowly. In saturated polyesters this peak is quite broad, the optimum amounts being from 3 per cent to 6 per cent for sebacate polyesters, and from 5 per cent to 8 per cent for succinate polyesters. As the amount of unsaturation increases the peak becomes much sharper and the actual amount of peroxide required for curing becomes much less. Thus for a sebacate polyester in which 4 mol per cent of the sebacic acid is replaced by maleic acid the optimum amount of peroxide is from .5 per cent to 1 per cent. For a corresponding succinate maleate polyester the optimum amount is from 1 per cent to 2 per cent.

Benzoyl peroxide is the most effective curing agent yet found, but other acyl peroxides, such as lauryl peroxide, are suitable although less effective. Certain other organic peroxides such as certain of the ether peroxides, ketone peroxides, olefin peroxides, terpene peroxides (particularly ascaridol), peracids and hydrocarbon peroxides are sufficiently effective to render them usable for curing the polyesters, particularly those containing unsaturation.

The reinforcing effect of the red iron oxide described above is dependent upon the amount of pigment used. Thus, a polyester made up of 50 mol per cent ethylene glycol, 50 mol per cent isopropylene glycol, 97 mol per cent succinic acid and 3 mol per cent maleic acid, when cured with 1.5 per cent benzoyl peroxide in the absence of any pigment, had a tensile strength not substantially greater than 100 pounds per square inch. This same rubber reached maximum tensile strength in the vicinity of 2,400 pounds per square inch when between 100 per cent and 150 per cent by weight of Mapico 297 was added prior to curing. As the amount of pigment was decreased from these values, the tensile strength fell off sharply, having a value of about 2,000 pounds per square inch with 75 per cent pigment and about 750 pounds per square inch with 25 per cent pigment. Above the optimum pigment content, the tensile strength fell off slowly. For other polyester rubbers, the optimum percentages for this pigment are substantially the same.

The red oxide of iron pigment referred to above is beneficial not only when used alone but also when mixed with other less efficient reinforcing pigments. The polyester rubber referred to above had a tensile strength of 2,300 pounds per square inch when compounded with 60 per cent by weight of Mapico 297 and 30 per cent by weight of Catalpo clay. This proportion of Mapico 297 alone gave a tensile strength of 1,650 pounds per square inch. With Catalpo clay, the maximum tensile strength obtainable was 1,300 pounds per square inch when 50 per cent by weight of clay was used. It is therefore apparent that the increase in tensile strength imparted by the mixture of pigments is much greater than that which would be expected from the mere additive effect of the individual pigments. Similar results are obtained when other less effective reinforcing pigments are mixed with Mapico 297.

Obviously, the synthetic rubber compounds of the present invention may contain any of the compatible rubber compounding ingredients such as softeners, plasticizers, bitumins, paraffin waxes, and similar materials.

The following specific example will illustrate the manner in which the present invention may be practiced.

*Example*

A reaction mixture made up of a mixture of dicarboxylic acids containing 96 mol per cent sebacic acid and 4 mol per cent maleic acid together with 25 per cent excess of a mixture of glycols containing 80 mol per cent isopropylene glycol and 20 mol per cent ethylene glycol was placed in a closed glass reaction vessel maintained at 200° C., together with a small amount of zinc chloride as a catalyst, and a slow stream of dry, oxygen-free hydrogen was bubbled continuously through the mixture. A packed reflux column maintained at 110° C. was attached to the reaction vessel. After about five hours no more water was evolved, indicating that substantially complete esterification had occurred. The reflux column was then removed and the pressure in the system was reduced to about 6 millimeters of mercury, the temperature being maintained at 200° C., and the bubbling of hydrogen being continued. Glycol distilled over rapidly and after about fifteen minutes an increase in the viscosity of the product was apparent. At the end of about eight hours the product was removed and found to be an exceedingly viscous, transparent liquid which crystallized slowly at room temperature to a tough, flexible, rubbery translucent solid. A portion of this solid substance was quickly reduced to its viscous liquid state by milling on cold rolls. The polyester was milled first with 0.75 per cent by weight of benzoyl peroxide and subsequently with 150 per cent by weight of Mapico 297. The resulting compound was cured in a rubber mold at 125° C. for ten minutes. The cured product had a tensile strength of 2,600 pounds per square inch at an elongation of about 600 per cent.

Although the invention has been described in terms of its specific embodiments, certain modifications and equivalents will be apparent to those skilled in the art and are intended to be included within the scope of the invention which is to be limited only by the reasonable scope of the appended claims.

What is claimed is:

1. A reinforced cured elastomer composition comprising a finely divided, substantially pure, red oxide of iron made up of spheroidal particles having an average size of the order of 60 millimicrons or less dispersed throughout a benzoyl peroxide cured ethylene glycol-isopropylene glycol-sebacic acid-maleic acid polyester elastomer, the ethylene glycol constituent of said polyester constituting about 20 mol per cent of the total ethylene glycol and isopropylene glycol, the maleic acid constituent constituting about 3 mol per cent of the total sebacic acid and maleic acid, the intramolecular ester chains of said polyester being essentially linear, the number of ester groups in said polyester constituting at least 98 per cent of the total number of ester, hydroxyl and carboxyl groups, said pigment being present in said composition in an amount between about 100 per cent and about 150 per cent by weight of said elastomer.

2. A reinforced cured elastomer composition comprising a finely divided, substantially pure, red oxide of iron made up of spheroidal particles having an average size of the order of 60 millimicrons or less dispersed throughout a benzoyl peroxide cured dihydroxyalkane-isopropylene glycol-sebacic acid-maleic acid polyester elastomer, the dihydroxyalkane being composed of two hydroxyl groups substituted on the opposite end carbon atoms of a straight chain alkane, the isopropylene glycol constituent of said polyester constituting at least 80 mol per cent of the total isopropylene glycol and dihydroxyalkane, the sebacic acid constituent constituting at least 95 mol per cent of the total sebacic acid and maleic acid, the intramolecular ester chains of said polyester being esssentially linear, the number of ester groups in said polyester constituting at least 98 per cent of the total number of ester, hydroxyl and carboxyl groups.

3. A reinforced cured elastomer composition comprising a finely divided, substantially pure, red oxide of iron made up of spheroidal particles having an average size of the order of 60 millimicrons or less dispersed throughout a benzoyl peroxide cured ethylene glycol-isopropylene glycol-succinic acid-maleic acid polyester elastomer, the ethylene glycol constituent of which and the isopropylene glycol constituent of which are present in substantially equimolar proportions, the maleic acid constituent of which constitutes about 3 mol per cent of the total succinic acid and maleic acid, the intramolecular ester chains of said polyester being essentially linear, the number of ester groups in said polyester constituting at least 98 per cent of the total number of ester, hydroxyl and carboxyl groups, said pigment being present in said composition in an amount between about 100 per cent and about 150 per cent by weight of said elastomer.

4. A reinforced cured elastomer composition comprising a finely divided, substantially pure, red oxide of iron made up of spheroidal particles having an average size of the order of 60 millimicrons or less dispersed throughout a benzoyl peroxide cured dihydroxyalkane-isopropylene glycol-succinic acid-maleic acid polyester elastomer, the dihydroxyalkane being composed of two hydroxyl groups substituted on the opposite end carbon atoms of a straight chain alkane, the isopropylene glycol constituent of said polyester constituting at least 50 mol per cent of the total isopropylene glycol and dihydroxyalkane, the succinic acid constituent of said polyester constituting at least 95 mol per cent of the total succinic acid and maleic acid, the intramolecular ester chains of said polyester being essentially linear, the number of ester groups in said polyester constituting at least 98 per cent of the total number of ester, hydroxyl and carboxyl groups.

5. A reinforced cured elastomer composition comprising a finely divided, substantially pure, red oxide of iron made up of spheroidal particles having an average size of the order of 60 millimicrons or less dispersed throughout a benzoyl peroxide cured ethylene glycol-isopropylene glycol-sebacic acid polyester elastomer, the isopropylene glycol constituent of which constitutes at least 80 mol per cent of the total isopropylene glycol and ethylene glycol, said polyester possessing an intrinsic viscosity in chloroform of at least .4.

6. A reinforced cured elastomer composition comprising a finely divided, substantially pure, red oxide of iron made up of spheroidal particles having an average size of the order of 60 millimicrons or less dispersed throughout a benzoyl peroxide cured dihydroxyalkane-isopropylene glycol-sebacic acid polyester elastomer, the isopropylene glycol constituent of which constitutes at least 80 mol per cent of the total isopropylene glycol and dihydroxyalkane, said polyester possessing an intrinsic viscosity in chloroform of at least .4.

7. A reinforced cured elastomer composition comprising a finely divided, substantially pure, red oxide of iron made up of spheroidal particles having an average size of the order of 60 millimicrons or less dispersed throughout a benzoyl peroxide cured dihydroxyalkane-dicarboxyalkanedicarboxyolefin polyester elastomer which possesses a sufficient degree of non-crystallinity to permit it to be milled directly on cold rolls, the dicarboxyolefin constituent constituting less than about 10 mol per cent of the total dicarboxyalkane and dicarboxyolefin, the intramolecular ester chains of said polyester being essentially linear, the number of ester groups of said polyester constituting at least 98 per cent of the total number of ester, hydroxyl and carboxyl groups.

8. A reinforced cured elastomer composition comprising a finely divided, substantially pure, red oxide of iron made up of spheroidal particles having an average size of the order of 60 millimicrons or less dispersed throughout a benzoyl peroxide cured dihydroxyalkane-dicarboxyalkane polyester elastomer which possesses a sufficient degree of non-crystallinity to permit it to be milled directly on cold rolls, said polyester having an intrinsic viscosity in chloroform of at least .4.

9. A reinforced cured elastomer composition comprising a finely divided, substantially pure, red oxide of iron made up of spheroidal particles having an average size of the order of 60 millimicrons or less dispersed throughout a benzoyl peroxide cured polyester elastomer, said polyester being sufficiently non-crystalline to permit it to be milled directly on cold rolls, the molecules of said polyester being made up essentially of divalent hydrocarbon radicals joined by carboxylic ester linkages to form essentially linear chains, said molecules possessing a degree of linear growth such that the average number of ester groups constitutes at least 98 per cent of the total number of ester, hydroxyl and carboxyl groups, said polyester molecules containing a substantial amount of olefinic unsaturation.

10. A reinforced cured elastomer composition comprising finely divided, substantially pure, red oxide of iron made up of spheroidal particles having an average size of the order of 60 millimicrons or less dispersed throughout an organic peroxide cured dihydroxy aliphatic hydrocarbon-dicarboxy hydrocarbon polyester, said polyester possessing a sufficient degree of non-crystallinity to permit it to be milled on cold rolls, said polyester containing less than 5 olefin bonds per 400 atoms in the linear ester chains, calculated by assuming no cross-linking between molecules at unsaturated bonds, said polyester containing no other non-benzenoid unsaturation, the number of ester groups in said polyester constituting at least 98 per cent of the total number of ester, carboxyl and hydroxyl groups.

11. A reinforced cured elastomer composition comprising an organic peroxide cured glycol-dicarboxylic acid polyester intimately mixed with a finely divided, substantially pure, red oxide of iron made up of spheroidal particles having an average size of the order of 60 millimicrons or less, said polyester having a degree of linear growth indicated by a ratio of ester groups to total ester, hydroxyl and carboxyl groups of at least 98 per cent.

FRANK S. MALM.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,255,313 | Ellis | Sept. 9, 1941 |